(12) United States Patent
Takagi (10) Patent No.: US 7,498,971 B2
(45) Date of Patent: Mar. 3, 2009

(54) IN-VEHICLE RADAR DEVICE

(75) Inventor: Toshikazu Takagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/778,111

(22) Filed: Jul. 16, 2007

(65) Prior Publication Data
US 2008/0224916 A1 Sep. 18, 2008

(30) Foreign Application Priority Data
Mar. 14, 2007 (JP) ............................. 2007-065161

(51) Int. Cl.
*G01S 13/93* (2006.01)
*G01S 7/40* (2006.01)
(52) U.S. Cl. ............................ 342/70; 342/71; 342/72; 342/91; 342/127; 342/174
(58) Field of Classification Search ............. 342/70–72, 342/91–93, 102, 127, 173, 174
See application file for complete search history.

(56) References Cited

U.S. PATENT DOCUMENTS

| 6,133,868 | A * | 10/2000 | Butler et al. ................ 342/174 |
| 7,248,209 | B2 * | 7/2007 | Shima et al. ................ 342/173 |
| 2003/0142012 | A1 * | 7/2003 | Nirabe ........................ 342/173 |
| 2005/0219117 | A1 * | 10/2005 | Hiromori et al. ............ 342/165 |
| 2005/0275585 | A1 * | 12/2005 | Shima et al. ................ 342/174 |
| 2008/0224916 | A1 * | 9/2008 | Takagi ........................ 342/91 |

FOREIGN PATENT DOCUMENTS

| JP | 10-232277 A | 9/1998 |
| JP | 10-332811 A | 12/1998 |
| JP | 2001-166029 A | 6/2001 |
| JP | 2002-162460 A | 6/2002 |
| JP | 2002-243854 A | 8/2002 |
| JP | 2006-10404 A | 1/2006 |
| JP | 2006349420 A | * 12/2006 |
| JP | 2008096196 A | * 4/2008 |
| JP | 2008122126 A | * 5/2008 |

* cited by examiner

*Primary Examiner*—John B Sotomayor
(74) *Attorney, Agent, or Firm*—Sughrue Mion, PLLC (57) ABSTRACT

An in-vehicle radar device includes: phase storing means 12 that prestores the phase of a received wave incoming secondarily from outside a target; received wave importing means 13 that imports the received wave on the basis of a radio wave reception timing determined by a transmission timing of the radio wave; phase detecting means 14 that determines the phase of the received wave imported by the received wave importing means; phase correction amount extracting means 15 that compares the phase prestored by the phase storing means 12 with the phase detected by the phase detecting means 14 and extracts and stores a phase correction amount of each of element antennas; and phase correcting means 16 that corrects the phase of a received signal of each of the element antennas on the basis of the phase correction amount obtained by the phase correction amount extracting means.

14 Claims, 10 Drawing Sheets

IN-VEHICLE RADAR DEVICE

BACKGROUND

1. Technical Field

The present invention relates to an in-vehicle radar device that is installed in a vehicle and retrieves position information of a target in front of the vehicle, and in particular to phase correction of an antenna of the radar device.

2. Related Art

An in-vehicle radar device is an in-vehicle digital beam forming (DBF) radar device using adaptive array antenna technology where plural element antennas are arrayed and which changes the characteristics of the antenna by adaptively controlling the amplitude and phase of signals received by the element antennas. The in-vehicle radar device is installed in the front portion of a vehicle, emits a millimeter waveband radio beam or laser beam toward the front, receives the beam reflected by a target, and detects whether or not the target is present and position information (relative distance, direction, relative speed) to the target.

Figure 11:
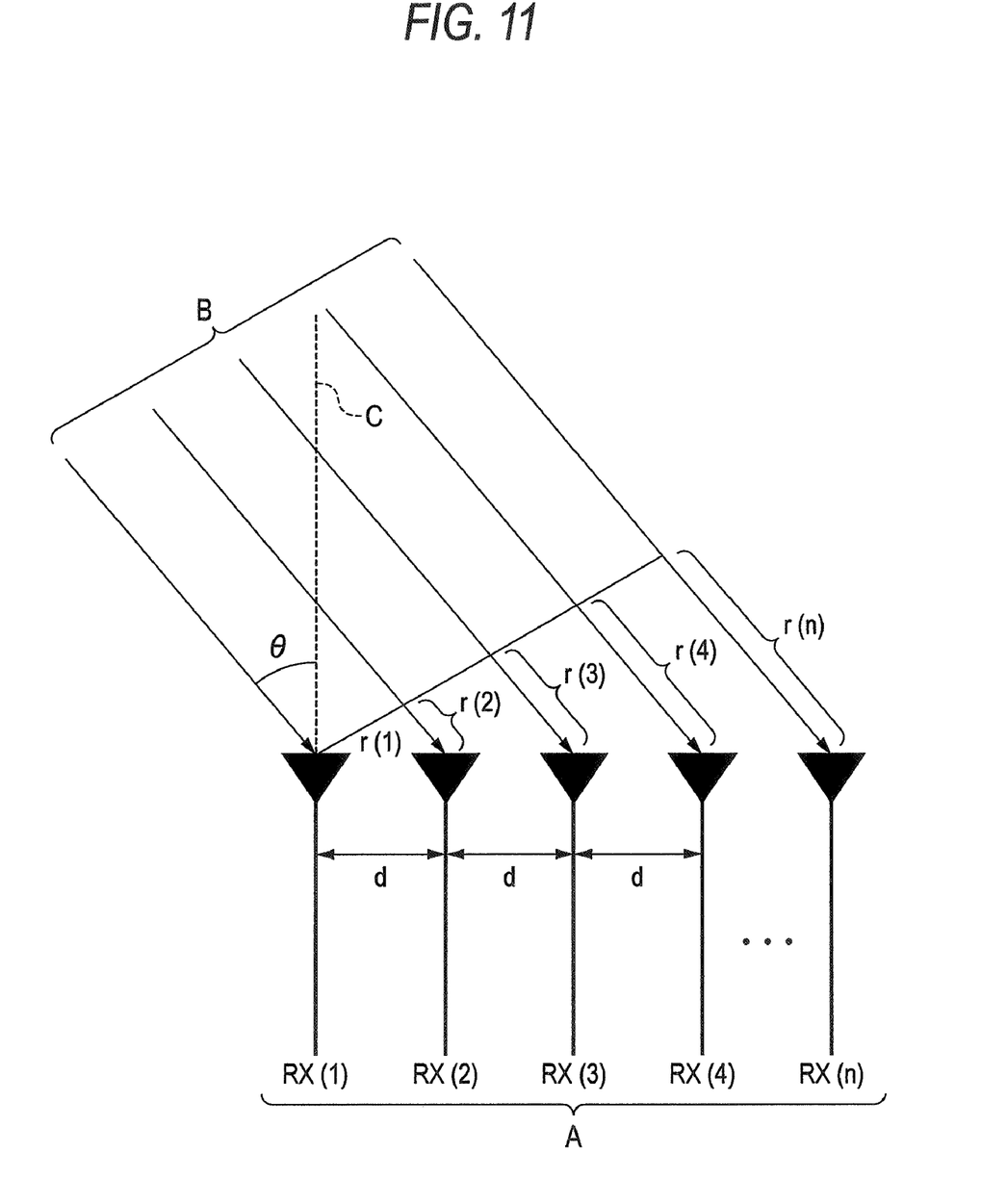
FIG. 11 is an explanatory diagram showing the basic principle of DBF processing by an in-vehicle DBF radar device.

The basic principle of the generation and scanning of the antenna beam in such an in-vehicle DBF radar device will be briefly described by FIG. 11.

As shown in FIG. 11, a radio wave receiving antenna A comprises plural element antennas RX(1) to RX(n) arrayed in intervals d.

Assuming that a radio wave B of a wavelength $\lambda$ is made incident from the outside on the radio wave receiving antenna A at an angle $\theta$ with respect to a front direction C of the element antennas RX(1) to RX(n) represented by the dotted line in the figure, a phase delay amount r(n) of the radio wave reaching each of the element antennas RX(1) to RX(n) is geometrically determined as in the following expression (1).

$RX(1): r(1)=0$ $RX(2): r(2)=d \sin \theta/\lambda$ $RX(3): r(3)=2d \sin \theta/\lambda$ $RX(4): r(4)=3d \sin \theta/\lambda$ $RX(n): r(n)=(n-1)\sin \theta/\lambda$ \hfill (1)

Here, each of the element antennas RX(1) to RX(n) receives the radio wave B at the same phase by advancing the phase of all the element antennas RX(1) to RX(n) the phase delay amount $\theta$ by DBF processing. Thus, the directionality of an array antenna 1 becomes oriented in the $\theta$ direction.

That is, by appropriately controlling this phase amount, it becomes possible to scan the antenna beam in a predetermined direction.

The above is the basic principle of the generation and scanning of an antenna beam by DBF processing.

However, an amplifier for amplifying the received signal of the radio wave receiving antenna is an active element, and when plural amplifiers are used, phase errors occur due to temperature changes and secular changes in the amplifier portions. Further, the tolerance of the element antenna disposed intervals that arises in the process of antenna manufacture becomes antenna phase error.

Because various error factors such as mentioned above are included, the phases r'(n) of the element antennas that are actually detected become as in the following expression (2).

Here, $\Delta dn$ is inter-element antenna distance error, $\Delta\theta n$ is flatness error that occurs due to warping and thermal expansion of a flat plate on which the element antennas are disposed, $\Phi n$ is phase error resulting from the delay of active devices and circuit paths, and $\alpha n$ is phase error of active devices resulting from temperature characteristics and secular changes.

$r(1)'=(d+\Delta d1)\sin(\theta+\Delta\theta 1)/\lambda+\Phi 1+\alpha 1$ $r(2)'=2(d+\Delta d2)\sin(\theta+\Delta\theta 2)/\lambda+\Phi 2+\alpha 2$ $r(3)'=3(d+\Delta d3)\sin(\theta+\Delta\theta 3)/\lambda+\Phi 3+\alpha 3$ $r(n)'=(n-1)(d+\Delta dn)\sin(\theta+\Delta\theta n)/\lambda+\Phi n+\alpha n$ \hfill (2)

In order to maintain inherent in-vehicle radar performance without the target detection precision dropping in the use environment of the in-vehicle radar device, it is necessary to correct initial phase errors and phase errors of the antenna and receiving system that occur in accompaniment with temperature characteristics and secular changes.

For this reason, in the in-vehicle DBF radar device described in JP-A-2002-162460, for example, a technique is employed where the phase errors of a reference element antenna and other element antennas are detected, and of the detected phase errors, the detected phase error of another element antenna belonging to the group including the reference element antenna is used as a reference, and the detected phase error is compared with an estimated phase error per element antenna belonging to the other group to determine a phase correction value. However, there are the problems that an element antenna serving as a reference is required, it is necessary to dispose a standard reflector in an azimuth 0 degree direction in front of the array antenna to detect initial phase error, and phase correction processing is not implemented unless the detected signal level resulting from the target is equal to or greater than a constant threshold.

SUMMARY

In view of the above-described points, it is an object of the present invention to provide an in-vehicle radar device that can detect and correct phase errors of antennas and a receiving system and prevent a drop in the detecting precision of a radar regardless of whether or not a target is present in front of a vehicle and traveling environment.

An in-vehicle radar device of the present invention attaches to a vehicle and includes a radar device body. The radar device body includes a oscillator that outputs a high-frequency signal, a radio wave transmitting antenna that transmits, as a radio wave, the high-frequency signal that the oscillator has outputted, an array antenna comprising plural element antennas for receiving the radio wave, emitting means that gauges a transmission timing of the radio wave, mixers that down-convert the received waves received by the plural element antennas and retrieve beat signals, and a signal processing unit that performs calculation for determining the phase of each of the element antennas from the beat signals and retrieving position information of a target in front of the vehicle. The in-vehicle radar device includes: phase storing means that prestores the phase of the received wave incoming secondarily from outside the target; received wave importing means that imports the received wave on the basis of a radio wave reception timing determined by the transmission timing of the radio wave; phase detecting means that determines the phase of the received wave imported by the received wave importing means; phase correction amount extracting means that compares the phase prestored by the phase storing means with the phase detected by the phase detecting means and extracts and stores a phase correction amount of each of the element antennas; and phase correcting means that corrects the phase of a received signal of each of the element antennas on the basis of the phase correction amounts obtained by the phase correction amount extracting means.

According to the in-vehicle radar device of the present invention, phase errors of an antenna and receiving system that occur in accompaniment with tolerance during manufacture of the antenna of the in-vehicle radar device, temperature changes and secular changes can be simply corrected regardless of whether or not a target is present in front, and a drop in the detecting precision of the radar can be prevented.

The foregoing and other objects, features, aspects, and advantages of the present invention will become more apparent from the following detailed description of the present invention when taken in conjunction with the accompanying drawings.

BRIEF DESCRIPTION OF THE DRAWINGS

Embodiments of the present invention will be described below with reference to the accompanying drawings, wherein.

DETAILED DESCRIPTION

First Embodiment

Figure 1:
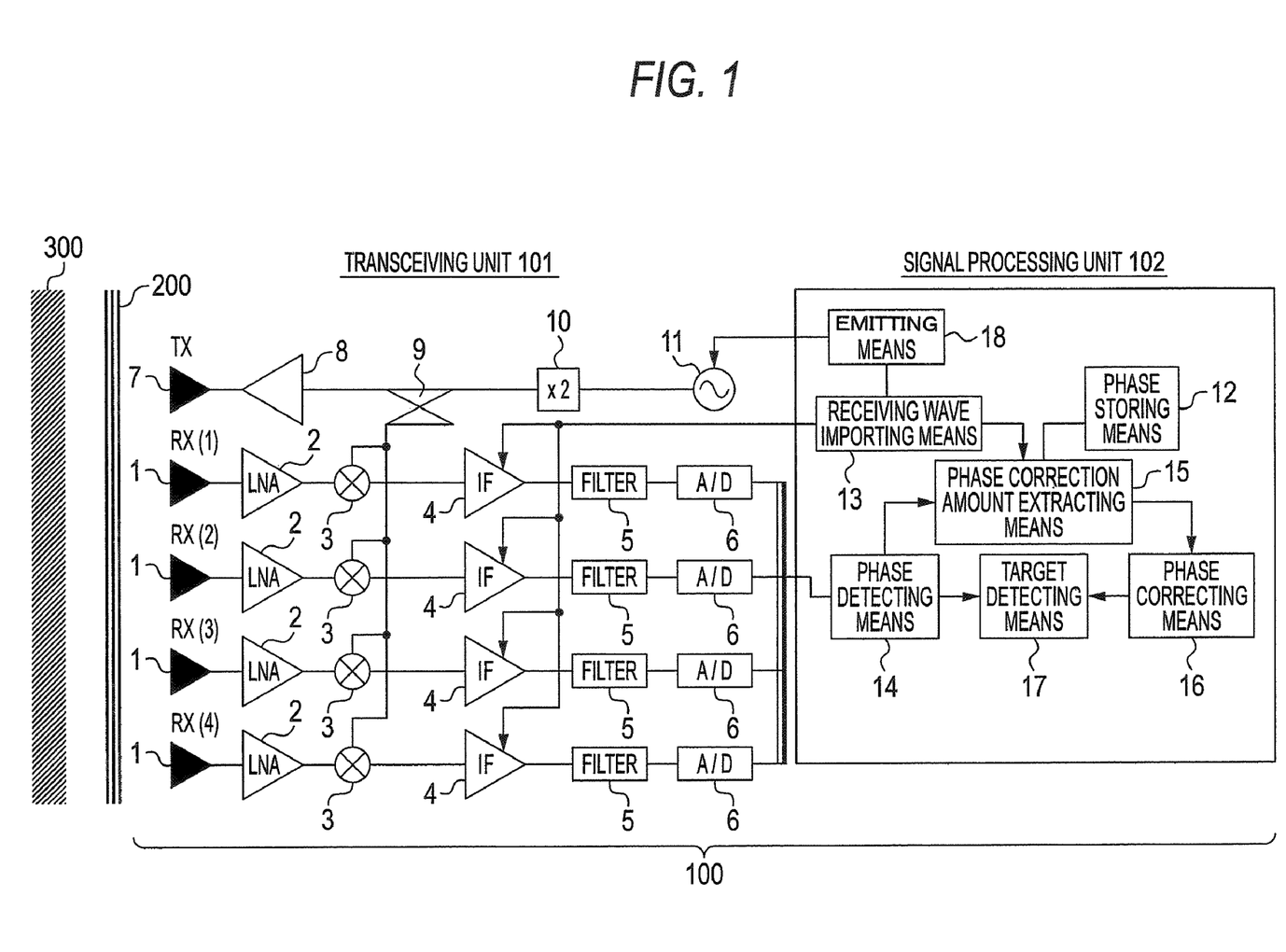
FIG. 1 is configural diagram of an in-vehicle radar device pertaining to a first embodiment of the invention.

FIG. 1 is a configural diagram showing an in-vehicle radar device that is a first embodiment of the present invention.

The in-vehicle radar device is configured by a radar device body 100, which includes a transceiving unit 101 and a signal processing unit 102, and a radome 200. The in-vehicle radar device is attached to a vehicle and retrieves position information of a target in front of the vehicle.

In the transceiving unit 101 of the radar device body 100, a high-frequency signal outputted by a oscillator 11 is multiplied by a multiplier 10, thereafter amplified by an amplifier 8 via a directional coupler 9, and is emitted into the air as a 50 GHz to 100 GHz radio wave from a radio wave transmitting antenna 7•TX. At this time, the output (e.g., amplitude, frequency, transmission timing, etc.) of the oscillator 11 is controlled by emitting means 18 that is disposed inside the signal processor 102 and gauges the transmission timing of the radio wave.

In order to receive the incoming radio wave, an array antenna comprising plural element antennas 1•RX(1) to RX(n) is disposed, and the received waves received by the element antennas 1 are amplified by low noise amplifiers (LNA) 2 and thereafter inputted to mixers 3.

Meanwhile, part of the high-frequency signal separated by the directional coupler 9 is inputted to the mixers 3, the received waves after amplification by the LNA 2 are down-converted by the mixers 3, and beat signals are generated.

The obtained beat signals are inputted to IF amplifiers 4, noise is removed therefrom by filters 5, and the beat signals are imported to the signal processing unit 102 via A/D converters 6.

The signal processing unit 102 is configured by phase storing means 12, received wave importing means 13, phase detecting means 14, phase correction amount extracting means 15, phase correcting means 16, target detecting means 17, and emitting means 18. The signal processing unit 102 detects the phase of each of the element antennas 1•RX(1) to RX(n) by FFT-processing the beat signals obtained by the phase detecting means 14, performs generation and scanning of an antenna beam by DBF processing, and retrieves position information of the target in front of the vehicle.

The phase storing means 12 stores an incoming predetermined direction with respect to a radio wave incoming secondarily from outside the target—e.g., a leaking wave from the radio wave transmitting antenna 7•TX. The phase of the received wave stored here may be either a design value or a default value at the time of antenna manufacture.

The received wave importing means 13 is triggered by a radio wave reception timing obtained from the emitting means 18 and imports the received wave in response to the time at which it reaches each of the element antennas 1•RX(1) to RX(n).

The phase detecting means 14 performs high-speed FFT calculation processing from the obtained beat signals and detects the phase of each of the element antennas.

The phase correction amount extracting means 15 compares the phase of each of the element antennas 1•RX(1) to RX(n) obtained by the phase detecting means 14 with the phase of a received wave prestored by the phase storing means 12, extracts phase correction amounts, and stores the phase correction amounts separately from the prestored phases of the element antennas.

The phase correcting means 16 offsets the phases of the element antennas on the basis of the phase correction amounts when a target is detected by the target detecting means 17 and corrects phase errors accompanying temperature characteristics and secular changes.

Figure 2:
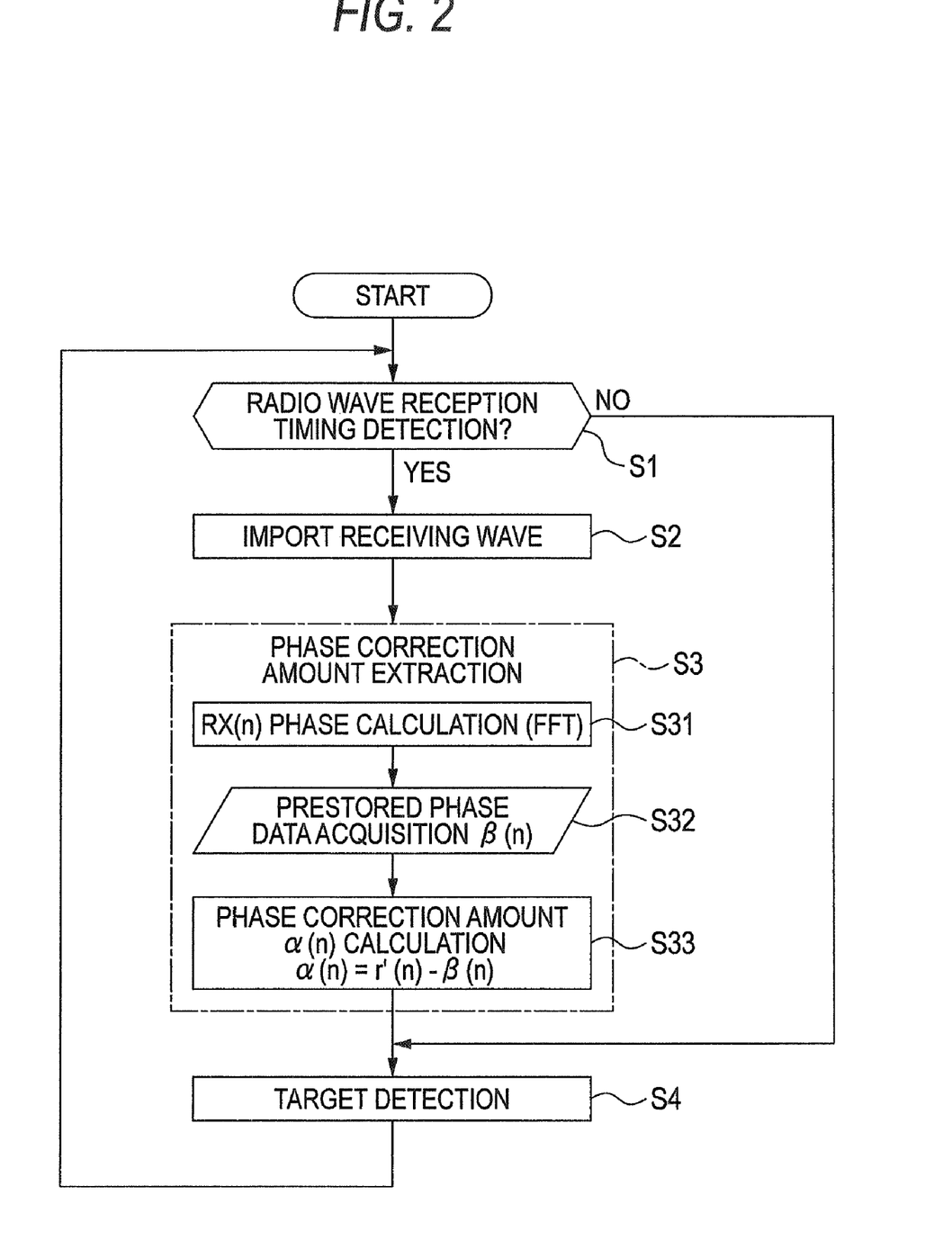
FIG. 2 is a flowchart showing the flow of processing pertaining to the first embodiment of the invention.

FIG. 2 is a flowchart showing the flow of processing in the signal processing unit 102.

Determination processing S1 is implemented by the received wave importing means 13. For example, a control signal such as a pulse emission S/W in the emitting means 18 is used to monitor whether or not there is a radio wave reception timing determined from the radio wave reception timing of the radio wave transmitting antenna 7•TX, and when the radio wave reception timing is detected, the flow moves to received wave importation processing S2.

When the radio wave reception timing is not detected, the flow moves to target detection processing S4, and target detection processing that detects a normal target is performed.

The received wave importation processing S2 is implemented by the received wave importing means 13. The gains of the IF amplifiers 4 are controlled from the received waves of each of the element antennas 1•RX(1) to RX(n) to obtain optimum beat signal levels, the beat signals are imported to the signal processing unit 102 via the A/D converters 6, and the flow moves to phase correction amount extraction processing S3 in order to extract the phase correction amount of each of the element antennas 1•RX(1) to RX(n).

In the phase correction amount extraction processing S3, repeat processing resulting from RX(n) phase calculation (FFT) processing S31, prestored phase data β(n) acquisition processing S32 and phase correction amount α(n) calculation processing S33 is performed, and phase correction amounts α(n) are extracted with respect to the element antennas 1•RX(1) to RX(n).

The RX(n) phase calculation (FFT) processing S31 is implemented by the phase detecting means 14. The phase of each of the element antennas is detected by FFT processing from the beat signal of each of the element antennas 1•RX(1) to RX(n) obtained by the received wave importation processing S2 to acquire actual phases r'(n).

In the prestored phase data β(n) acquisition processing S32, phase data β(n) with respect to the element antennas 1•RX(1) to RX(n) prestored by the phase storing means 12 are acquired.

The phase correction amount α(n) calculation processing S33 is implemented by the phase correction amount extracting means 15, which performs phase correction amount α(n) for calculating the difference between the phase data β(n) with respect to the element antennas 1•RX(1) to RX(n) that have been acquired and the actual phases r'(n) acquired in the RX(n) phase calculation (FFT) processing S31.

The basic principle of the phase correction amount extraction processing S3 is as follows.

In expression (2), when the received wave is a leaking wave from the radio wave transmitting antenna 7•TX, for example, then the incident angle of the radio wave becomes θ=π/2 because the radio wave arrives from the direction of the radio wave transmitting antenna 7•TX.

Further, because the error Φn resulting from flatness degradation is θ>>Δθn, Δθn is a level that can be ignored with respect to θ=π/2. Thus, the term of the sin function in expression (2) becomes as follows.

$$\sin(\theta+\Delta\theta n) \cong \sin\theta = 1 \quad (3)$$

When the first term and the second term of expression (2) are replaced by βn as follows, then the following is obtained.

$$\beta(n)=(n-1)(d+\Delta dn)\sin(\theta+\Delta\theta n)/\lambda+\Phi n \quad (4)$$

Here, because the variation amount of the inter-element antenna distance error Δdn is mainly due to thermal expansion of the flat plate on which the element antennas are disposed, it becomes the same gradient with respect to temperature changes (the same is also true of the flatness error Δθn). However, the inter-element antenna distance error Δdn and the flatness error Δθn are extremely slight in comparison to the phase error Φn resulting from the delay of active devices and circuit paths and the delay time (phase error) αn resulting from temperature changes and secular changes, so the following is obtained when these are omitted.

$$\beta n=(n-1)d\sin\theta/\lambda+\Phi n \quad (5)$$

Thus, the phases r'(n) of the element antennas that are actually detected become as in the following expression from expression (2).

$$r'(1)=\beta 1+\alpha 1$$

$$r'(2)=\beta 2+\alpha 2$$

$$r'(3)=\beta 3+\alpha 3$$

$$r'(4)=\beta 4+\alpha 4$$

$$r'(n)=\beta n+\alpha n \quad (6)$$

In the above expression, the initial phase error βn of the element antennas including the phase error Φn resulting from the delay of active devices and circuit paths can be measured by real machine inspection at the time of assembly and at the time of shipment, so it suffices to prestore the phase βn (or, the same effect is also obtained even with β'n=(n−1)d•sin θ/λ, putting the term Φn outside such that r'(n)=β'n+Φn+αn).

By calculating the difference between βn and the detected phases r'(n) by the following expression (7), the phase errors αn of the antennas and the receiving system of the in-vehicle radar device with respect to temperature characteristics and secular changes can be simply calculated.

$$\alpha 1=\beta 1-r'(1)$$

$$\alpha 2=\beta 2-r'(2)$$

$$\alpha 3=\beta 3-r'(3)$$

$$\alpha 4=\beta 4-r'(4)$$

$$\alpha n=\beta n-r'(n) \quad (7)$$

Consequently, by extracting the phase correction amount αn of each of the element antennas 1RX(1) to RX(n) by the phase correction amount extraction processing S3 and offsetting the extracted αn as phase correction amounts with respect to the element antennas 1•RX(1) to RX(n) in the target detection processing S4, generation and scanning of an antenna beam whose antenna and receiving system phase error has been corrected in DBF processing becomes possible.

As described above, phase correction of the element antennas 1•RX(1) to RX(n) is possible regardless of whether or not the target is present in front of the vehicle.

In the preceding, as the radio wave incoming secondarily from outside a target, a leaking wave from the radio wave transmitting antenna 7•TX, for example, was assumed, and the incoming direction of the received wave 7 was that of the radio wave transmitting antenna, but the same effect is obtained even with a reflected wave incoming from a structural object inside the minimum detection distance of the in-vehicle radar device—e.g., a vehicle body structural object 300 in the vicinity of a vehicle attachment portion—because the phase data β(n) with respect to the element antennas 1•RX(1) to RX(n) are each determined with respect to those objects.

Second Embodiment

Figure 3:
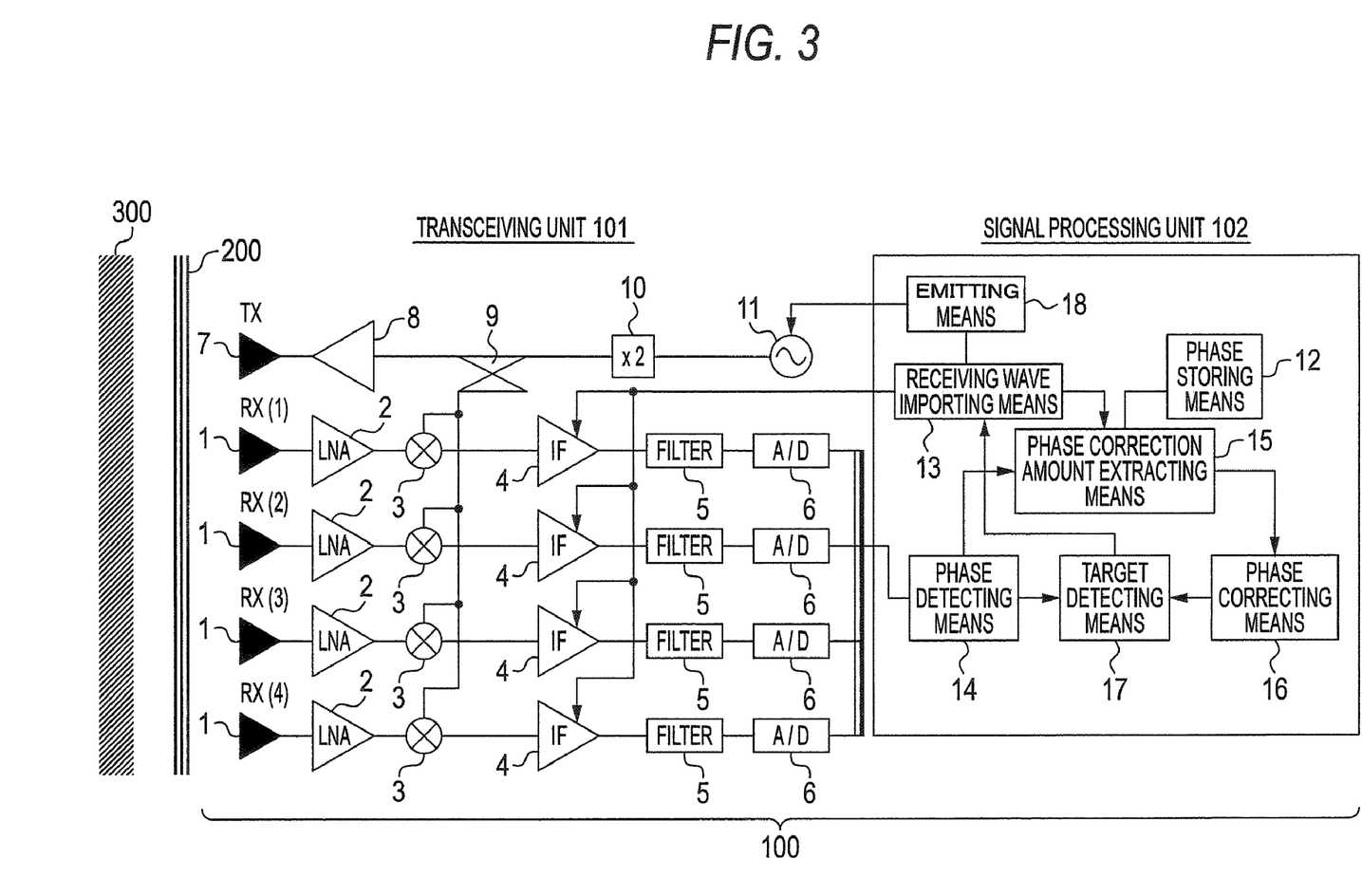
FIG. 3 is configural diagram of an in-vehicle radar device pertaining to a second embodiment of the invention.
Figure 4:
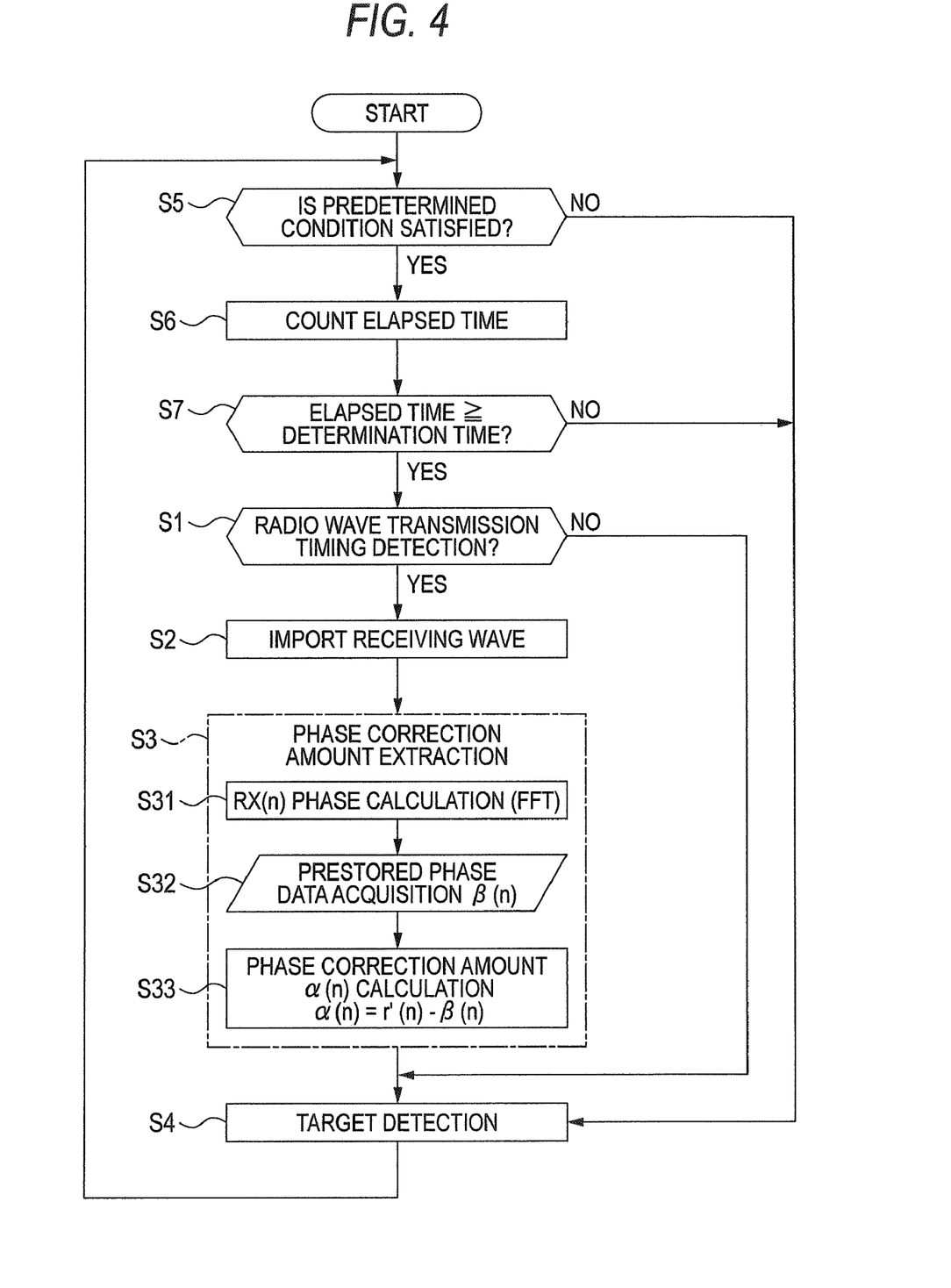
FIG. 4 is a flowchart showing the flow of processing pertaining to the second embodiment of the invention.

FIG. 3 is a configural diagram of an in-vehicle radar device showing a second embodiment in the present invention. FIG. 4 is a flowchart showing the flow of processing in the signal processing unit thereof.

The second embodiment is the same as the first embodiment in that the signal processing unit 102 includes a mode (normal mode) that performs target detection processing and a mode (phase correction mode) that performs phase correction of the antennas, but the second embodiment is configured such that processing S5, S6 and S7 are added before the processing S1, and the signal processing unit 102 moves to the phase correction mode by the received wave importing means 13 when a predetermined condition is satisfied and returns to the normal mode after the end of the phase correction mode.

Here, the predetermined condition is determined on the basis of information resulting from the target detecting means 17 of the signal processing unit 102 of the radar device body 100, and is when an ignition switch of the vehicle is ON, when the speed of the vehicle is equal to or less than a separately determined vehicle speed (e.g., such as during traffic congestion when the in-vehicle radar device does not require angle measuring capability, or when the vehicle is traveling at a low speed, or when the vehicle is stopped), or when the in-vehicle radar device has not detected the target.

Moreover, the signal processing unit 102 moves to the phase correction mode and implements phase correction of the antennas and the receiving system of the in-vehicle radar device when the predetermined condition continues for an amount of time equal to or greater than a predetermined amount of time, whereby a situation where the phase correction mode and the normal mode frequently switch back and forth is controlled (processing S6, S7).

According to the second embodiment, the number of times that phase correction of the antennas and the receiving system is performed can be controlled, so the signal processing burden of the in-vehicle radar device is controlled and, as a result, occurrences of malfunctions resulting from phase correction processing in the normal mode are prevented. Moreover, because the signal processing unit 102 is configured to move to the phase correction mode when the predetermined condition continues for an amount of time equal to or greater than a predetermined amount of time, a situation where the calculation result of the phase correction amount becomes unstable due to frequent switching back and forth between the phase correction mode and the normal mode, or a situation where control of the in-vehicle radar device becomes unstable, can be controlled.

Third Embodiment

Figure 5:
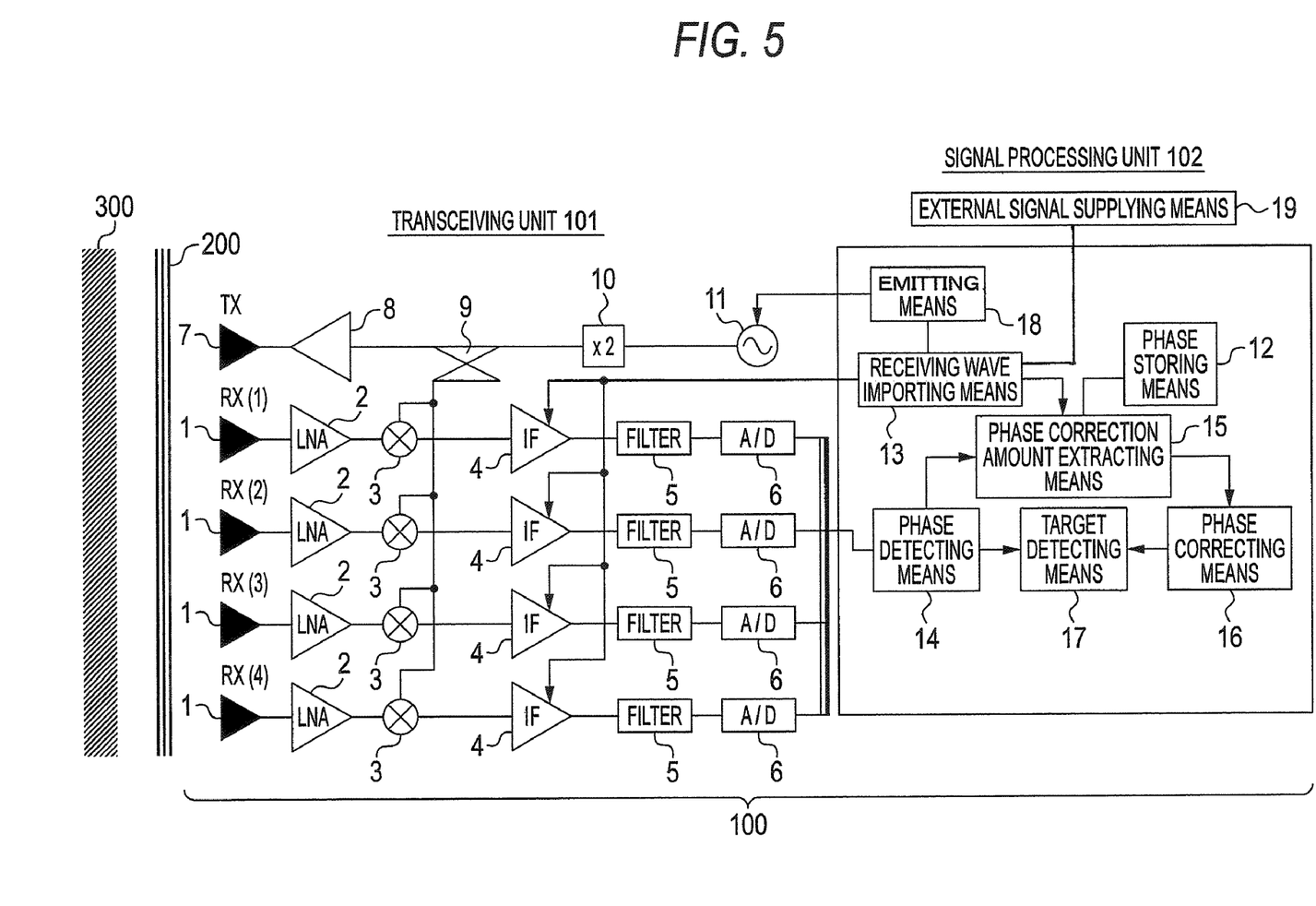
FIG. 5 is configural diagram of an in-vehicle radar device pertaining to a third embodiment of the invention.
Figure 6:
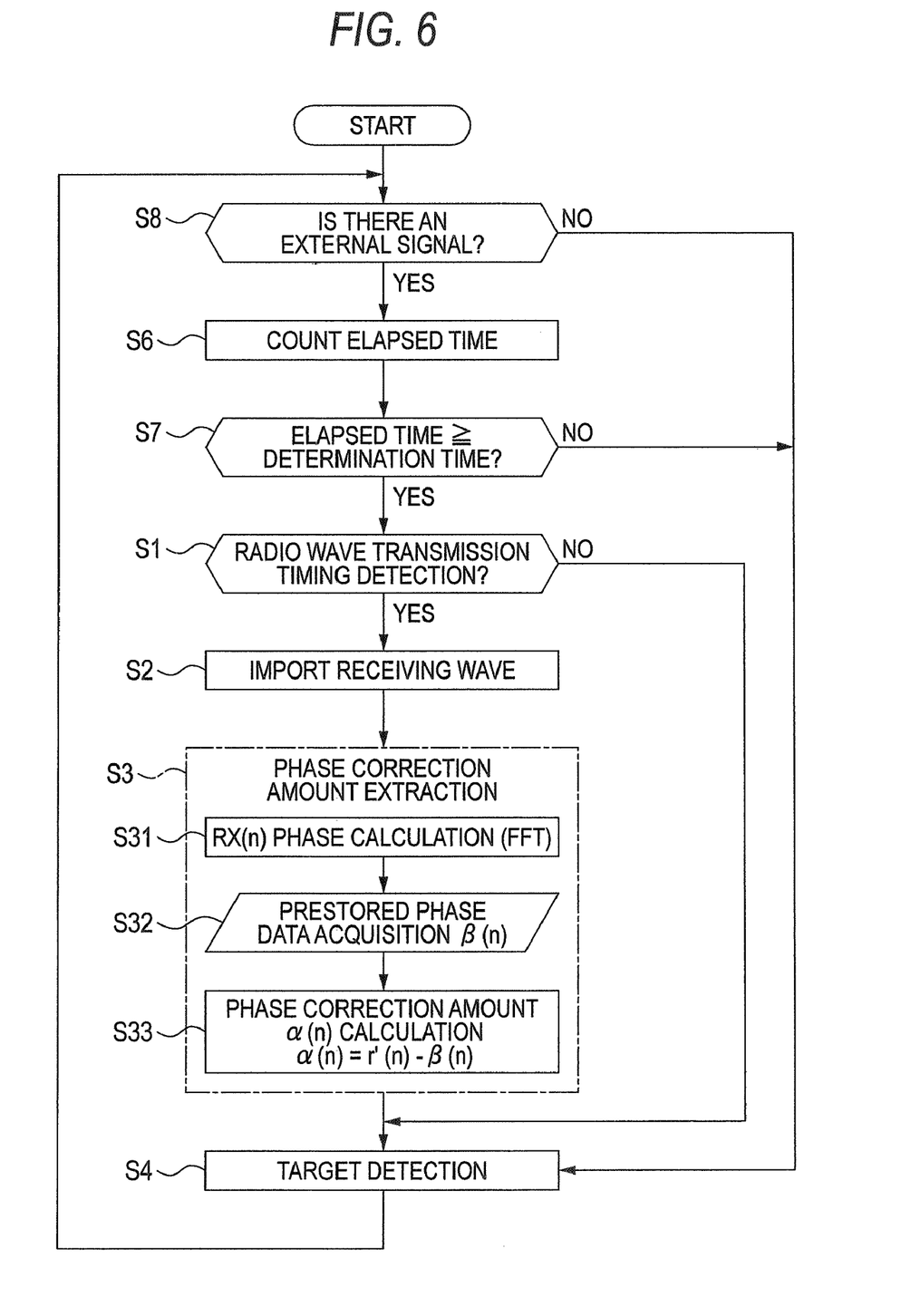
FIG. 6 is a flowchart showing the flow of processing pertaining to the third embodiment of the invention.

FIG. 5 is a configural diagram of an in-vehicle radar device showing a third embodiment in the present invention. FIG. 6 is a flowchart showing the flow of processing in the signal processing unit thereof.

The third embodiment is the same as the second embodiment in that the signal processing unit 102 is configured to move to the phase correction mode by the received wave importing means 13 when the predetermined condition is satisfied, returns to the normal mode after the end of the phase correction mode, and moves to the phase correction mode by the received wave importing means 13 when the predetermined condition—such as when the ignition switch of the vehicle is ON, when the vehicle speed is equal to or less than a separately determined vehicle speed (e.g., during traffic congestion when the in-vehicle radar device does not require angle measuring capability, or when the vehicle is traveling at a low speed, or when the vehicle is stopped), or when the in-vehicle radar device has not detected the target—is satisfied. However, whereas in the second embodiment whether or not the predetermined condition is satisfied is determined on the basis of information based on the target detecting means 17, in the third embodiment, processing S8 that determines this on the basis of an outside signal from outside signal supplying means 19 such as the output of a vehicle speed sensor or the like disposed in the vehicle is disposed in place of the processing S5.

According to the third embodiment, similar to the second embodiment, the effect that a situation where the calculation result of the phase correction amount becomes unstable due to frequent switching back and forth between the phase correction mode and the normal mode, or a situation where control of the in-vehicle radar device becomes unstable, can be controlled is obtained.

Fourth Embodiment

Figure 7:
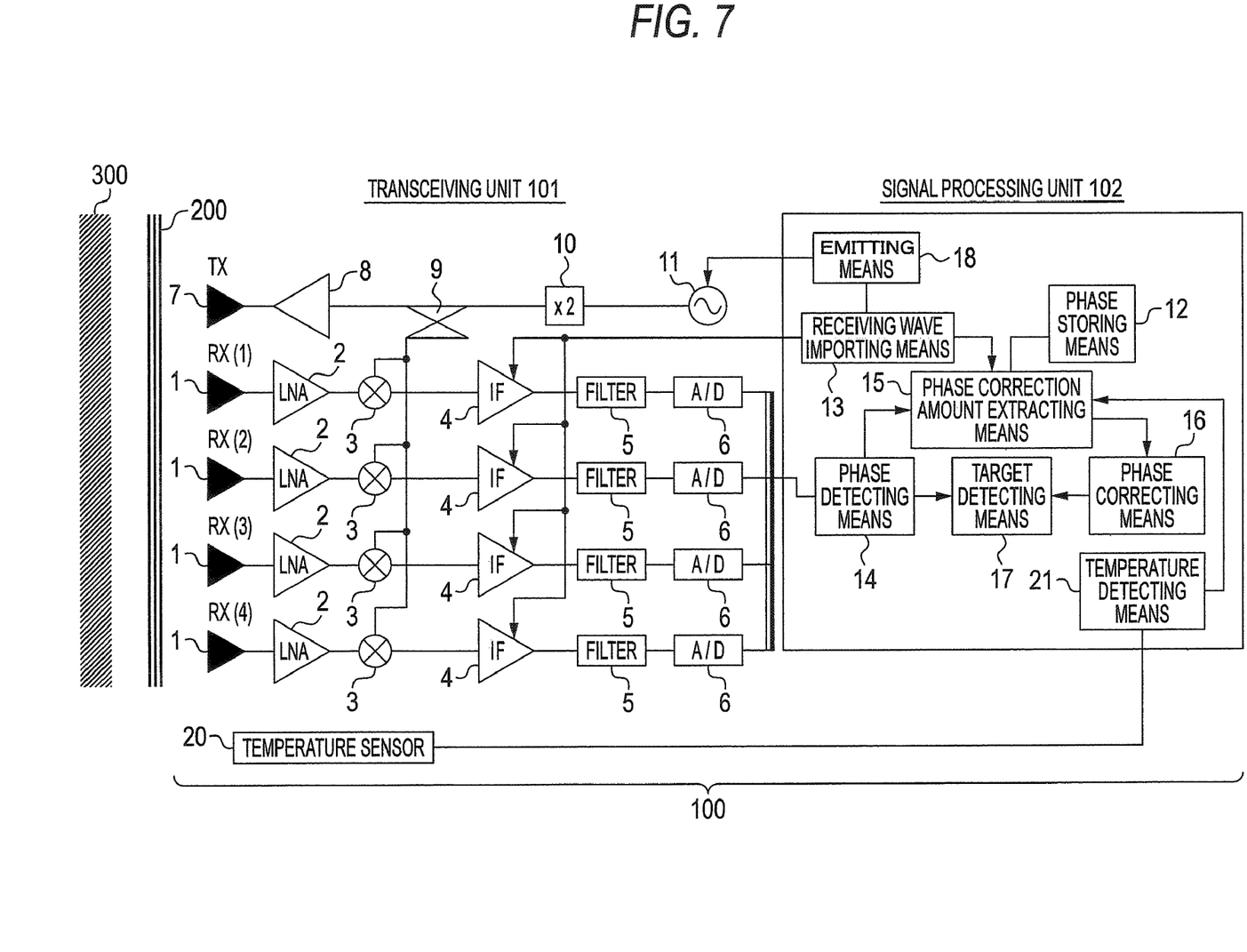
FIG. 7 is configural diagram of an in-vehicle radar device pertaining to a fourth embodiment of the invention.
Figure 8:
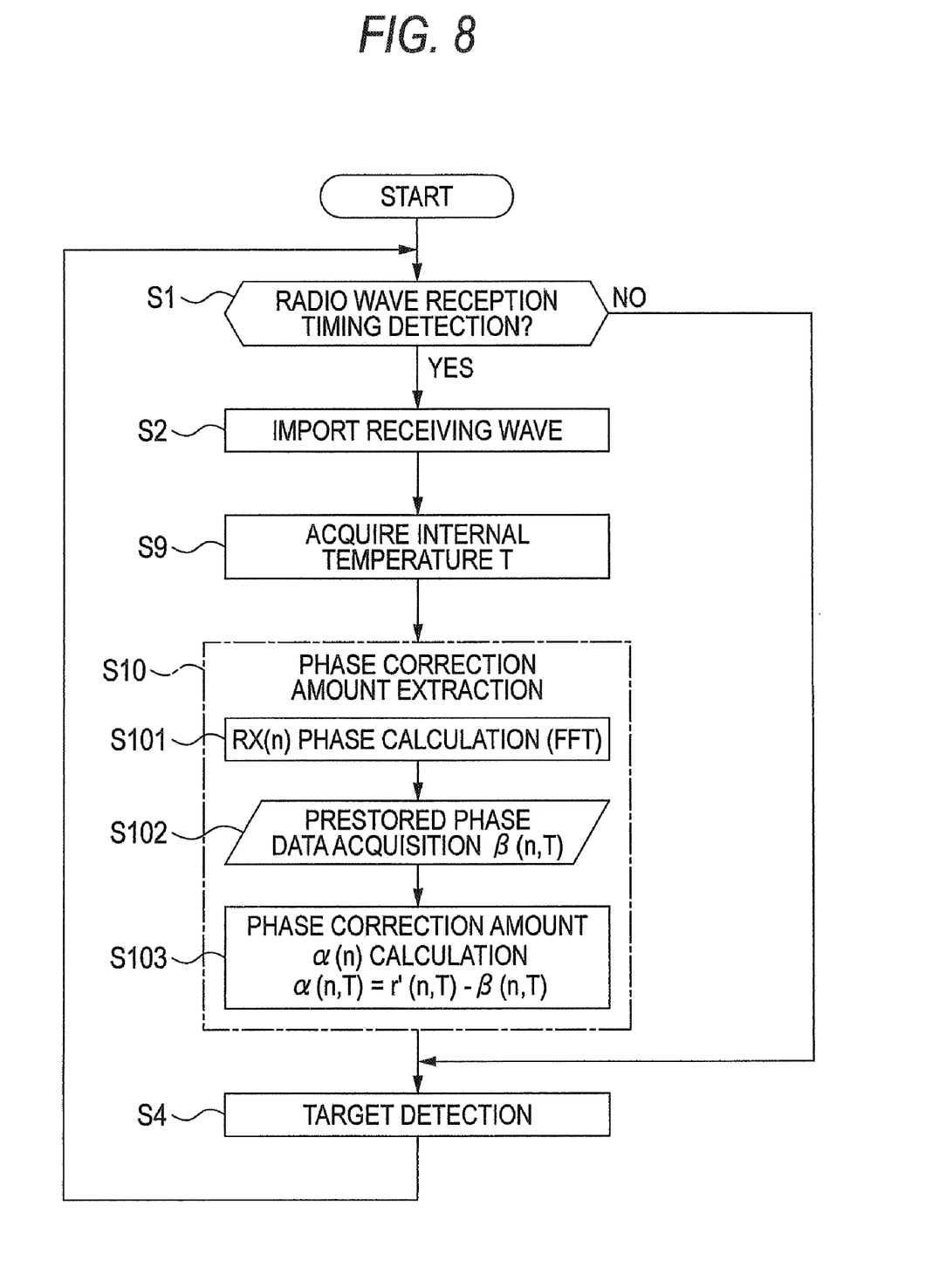
FIG. 8 is a flowchart showing the flow of processing pertaining to the fourth embodiment of the invention.

FIG. 7 is a configural diagram of an in-vehicle radar device showing a fourth embodiment in the present invention. FIG. 8 is a flowchart showing the flow of processing relating to the fourth embodiment in the present invention.

In the fourth embodiment, in addition to the configuration of the first embodiment, a temperature sensor 20 and temperature detecting means 21 that detects temperature are disposed in the radar device body 100, and the in-vehicle radar device is configured to monitor an internal temperature T of the radar device body 100 and be capable of performing phase correction in regard to inter-element antenna distance error and flatness error that change due to internal temperature on the basis of temperature correction data in the phase correction amount extracting means 15.

The temperature correction data are, for example, the inter-element antenna distance error $\Delta dn$. The inter-element antenna distance error $\Delta dn$ of each internal temperature T is prestored as predetermined temperature correction data in the phase correction amount extracting means 15, and because $\Delta dn$ is determined using the internal temperature T as a parameter, $\beta(n, T)$ is determined by expression (4).

In FIG. 8, the internal temperature T is acquired by processing S9, and in phase correction amount extraction processing S10, RX(n) phase calculation (FFT) processing S101 is performed, thereafter phase data $\beta(n, T)$ are acquired using the internal temperature T of the radar device body 100 as a parameter for each of the element antennas 1·RX(1) to RX(n) in processing S102, and phase correction amount $\alpha(n, T)$ extraction processing is performed in processing S103, whereby a phase correction amount $\alpha(n, T)$ including the inter-element antenna distance error $\Delta dn$ is obtained.

According to the fourth embodiment, because a phase correction amount matching each internal temperature of the radar device body 100 is obtained, phase correction becomes possible in regard also to inter-element antenna distance error and flatness error that change depending on the temperature, and the phase correction precision of the antenna and the receiving system can be further improved.

Fifth Embodiment

Figure 9:
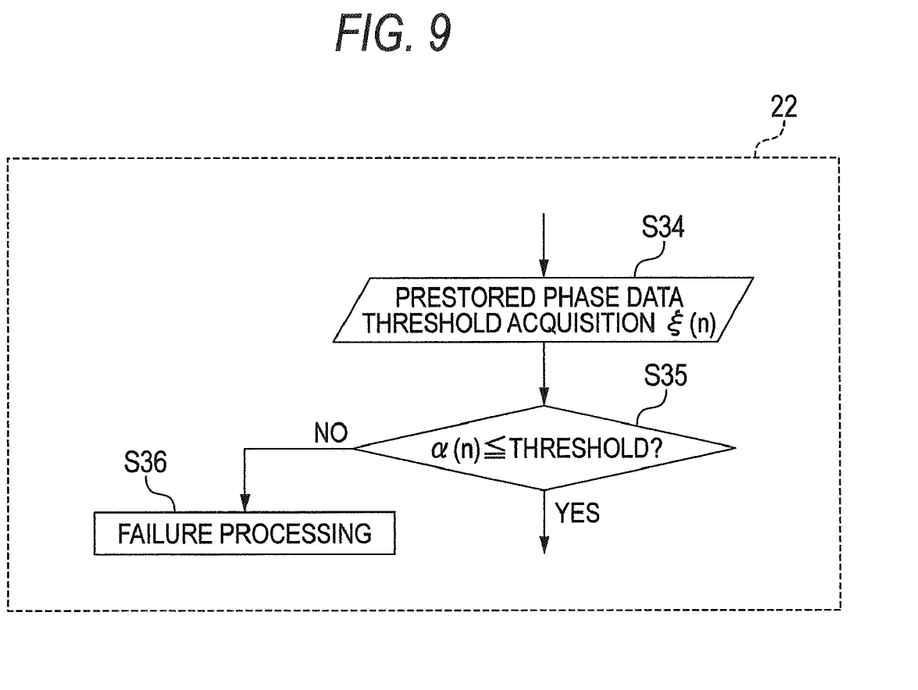
FIG. 9 is a flowchart showing the flow of processing relating to a fifth embodiment of the invention.

FIG. 9 is part of a flowchart showing the flow of processing relating to a fifth embodiment in the present invention.

In the fifth embodiment, in addition to the first embodiment, stored in the phase storing means 12 in addition to $\beta(n)$ of the element antennas 1·RX(1) to RX(n) is a threshold $\xi(n)$ with respect to $\beta(n)$, and failure detecting means 22 is disposed inside the signal processing unit 102.

The processing of FIG. 9 is implemented after the processing S33 in the phase correction amount extraction processing S3 of FIG. 2. In the processing S34, the prestored threshold $\xi(n)$ is acquired, it is determined by processing S35 whether or not the phase correction amount $\alpha(n)$ obtained by processing S33 exceeds the threshold $\xi(n)$, and when the phase correction amount $\alpha(n)$ of each element antenna that has been detected exceeds the threshold $\xi(n)$, then the flow moves to failure processing S36.

In the failure processing S36, a reset is applied to the radar device body 100, or the radar device body 100 and the system using the radar device body 100 are shut down.

Further, for example, a user is notified that the reliability of the in-vehicle radar device has dropped by a flashing light on an operation panel or by giving notification of abnormality using another in-vehicle device such as a car navigation system or car audio.

According to the fifth embodiment, because failure of the antenna and receiving system of the in-vehicle radar device can be detected, malfunction of the in-vehicle radar device and malfunction of a system including the in-vehicle radar device can be prevented.

Sixth Embodiment

Figure 10:
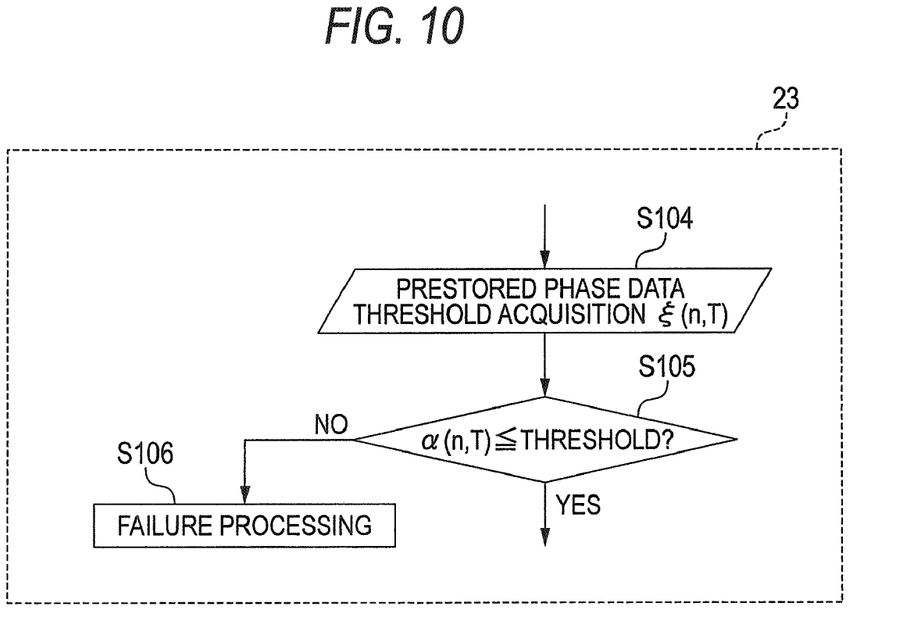
FIG. 10 is a flowchart showing the flow of processing pertaining to a sixth embodiment of the invention.

FIG. 10 is a part of a flowchart showing the flow of processing relating to a sixth embodiment in the present invention.

In addition to the first embodiment, stored in the phase storing means 12 in addition to β(n) of the element antennas 1·RX(1) to RX(n) is a threshold ξ(n, T) with respect to β(n), and failure detecting means 23 is disposed inside the signal processing unit 102.

The processing of FIG. 10 is implemented after the processing S103 in the phase correction amount extraction processing S10 of FIG. 8.

In processing S104, the prestored threshold ξ(n, T) is acquired, it is determined by processing S105 whether or not the phase correction amount α(n) obtained by processing S103 exceeds the threshold ξ(n, T), and when the phase correction amount α(n) of each element antenna that has been detected exceeds the threshold ξ(n, T), then the flow moves to failure processing S106.

In the failure processing S106, a reset is applied to the radar device body 100, or the radar device body 100 and the system using the radar device body 100 are shut down.

Further, for example, a user is notified that the reliability of the in-vehicle radar device has dropped by a flashing light on an operation panel or by giving notification of abnormality using another in-vehicle device such as a car navigation system or car audio.

According to the sixth embodiment, by disposing the threshold ξ(n, T) with respect to β(n, T) per temperature with respect to variation where variation amounts become the same pitch with respect to temperature such as inter-element antenna distance error Δdn and flatness error Δθn dependent on thermal expansion, failure determination discrimination as to whether it is phase error resulting from temperature characteristics or phase error resulting from secular changes becomes possible.

Various modifications and alterations of this invention will be apparent to those skilled in the art without departing from the scope and spirit of this invention, and it should be understood that this is not limited to the illustrative embodiments set forth herein.

What is claimed is:

1. An in-vehicle radar device that attaches to a vehicle and includes a radar device body including a oscillator that outputs a high-frequency signal, a radio wave transmitting antenna that transmits, as a radio wave, the high-frequency signal that the oscillator has outputted, an array antenna comprising plural element antennas for receiving the radio wave, emitting means that controls a transmission timing of the radio wave, mixers that down-convert the received waves received by the plural element antennas and retrieve beat signals, and a signal processing unit that performs calculation for determining the phase of each of the element antennas from the beat signals and retrieving position information of a target in front of the vehicle, the in-vehicle radar device comprising:
 phase storing means that prestores the phase of the received wave incoming secondarily from outside the target;
 received wave importing means that imports the received wave on the basis of a radio wave reception timing determined by the transmission timing of the radio wave;
 phase detecting means that determines the phase of the received wave imported by the received wave importing means;
 phase correction amount extracting means that compares the phase prestored by the phase storing means with the phase detected by the phase detecting means and extracts and stores a phase correction amount of each of the element antennas; and
 phase correcting means that corrects the phase of a received signal of each of the element antennas on the basis of the phase correction amounts obtained by the phase correction amount extracting means.

2. The in-vehicle radar device of claim 1, wherein the received wave is a leaking wave from the radio wave transmitting antenna, and the received wave importing means imports the received wave in response to the time when the leaking wave reaches the element antennas.

3. The in-vehicle radar device of claim 1, wherein the received wave is a reflected wave of a radome housing the radar device body, and the received wave importing means imports the received wave in response to the time when the reflected wave of the radome reaches the element antennas.

4. The in-vehicle radar device of claim 1, wherein the received wave is a reflected wave from a vehicle body structural object in the vicinity of a vehicle attachment portion, and the received wave importing means imports the received wave in response to the time when the reflected wave from the vehicle body structural object reaches the element antennas.

5. The in-vehicle radar device of claim 1, wherein the received wave importing means performs gain control of IF amplifiers that amplify the beat signals on the basis of the radio wave reception timing obtained by the emitting means.

6. The in-vehicle radar device of claim 1, wherein the phase storing means, the received wave importing means, the phase detecting means, the phase correction amount extracting means and the phase correcting means are configured inside the signal processing unit.

7. The in-vehicle radar device of claim 1, wherein the signal processing unit includes a normal mode that performs detection processing of the target and a phase correction mode that performs phase correction of the antenna, moves to the phase correction mode when a predetermined condition is satisfied, and returns to the normal mode after the end of the phase correction mode.

8. The in-vehicle radar device of claim 7, wherein the predetermined condition is any of when an ignition switch of the vehicle is ON, when the speed of the vehicle is equal to or less than a predetermined vehicle speed, or when the in-vehicle radar device has not detected the target.

9. The in-vehicle radar device of claim 7, wherein the phase correction mode is performed when the predetermined condition continues for an amount of time equal to or greater than a predetermined amount of time.

10. The in-vehicle radar device of claim 1, wherein the phase correction amount extracting means extracts the phase correction amount on the basis of temperature correction data corresponding to inter-element antenna distance error of each internal temperature of the radar device body stored beforehand.

11. The in-vehicle radar device of claim 10, further comprising failure detecting means that determines that the element antennas have failed when the phase correction amount exceeds a predetermined threshold.

12. The in-vehicle radar device of claim 11, wherein the threshold is set in correspondence to each internal temperature of the radar device body.

13. The in-vehicle radar device of claim 11, wherein when the failure detecting means detects failure of the element antennas, it applies a reset to or stops driving the radar device body.

14. The in-vehicle radar device of claim 11, wherein the failure detecting means includes notifying means which, when the failure detecting means detects failure of the element antennas, notifies a user thereof.

* * * * *